March 23, 1937.  W. G. HOELSCHER  2,074,961

MACHINE TOOL FEEDING MECHANISM

Filed Sept. 16, 1935  3 Sheets-Sheet 1

INVENTOR

William G. Hoelscher

BY

Wood & Wood

ATTORNEYS

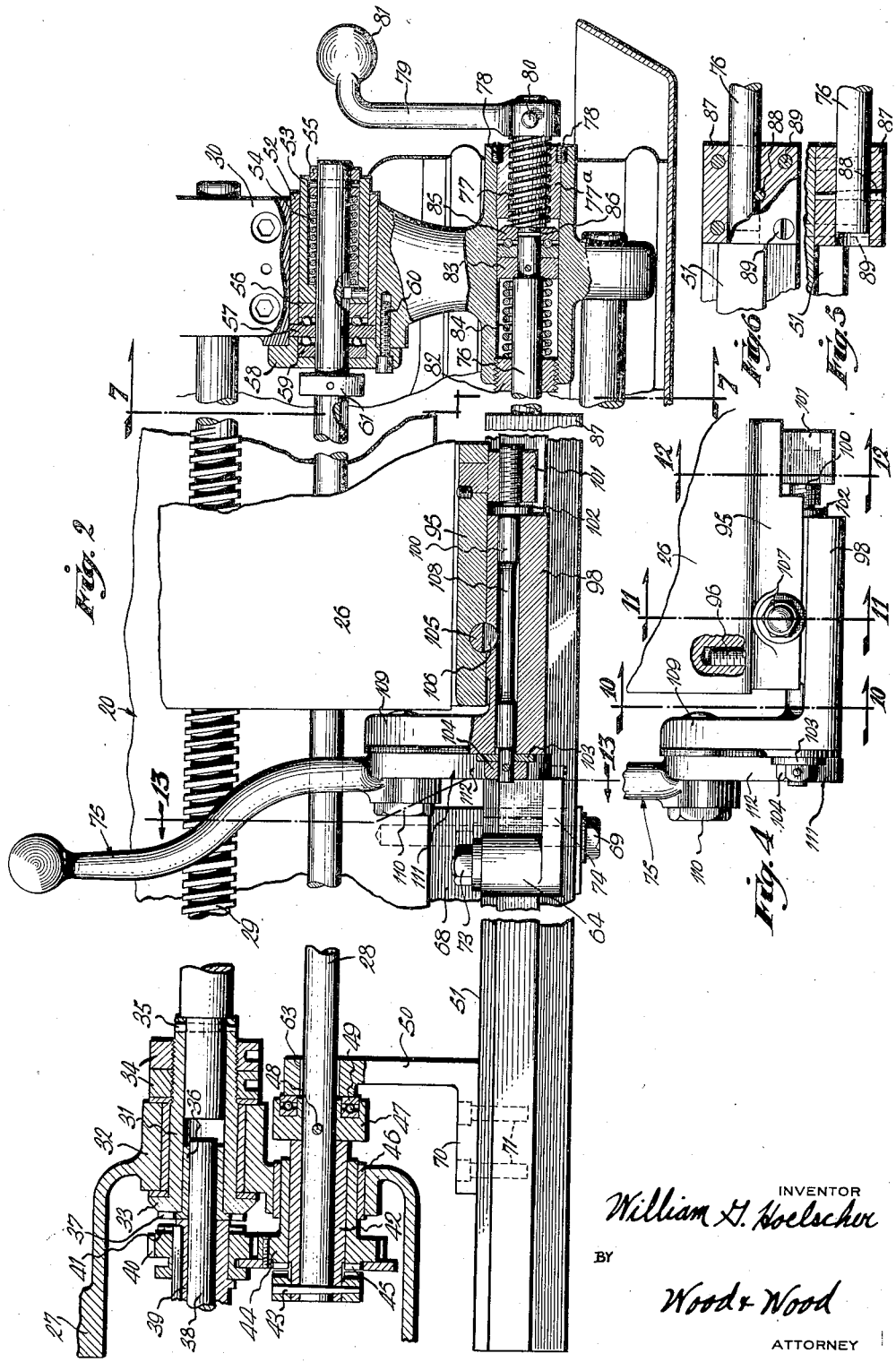

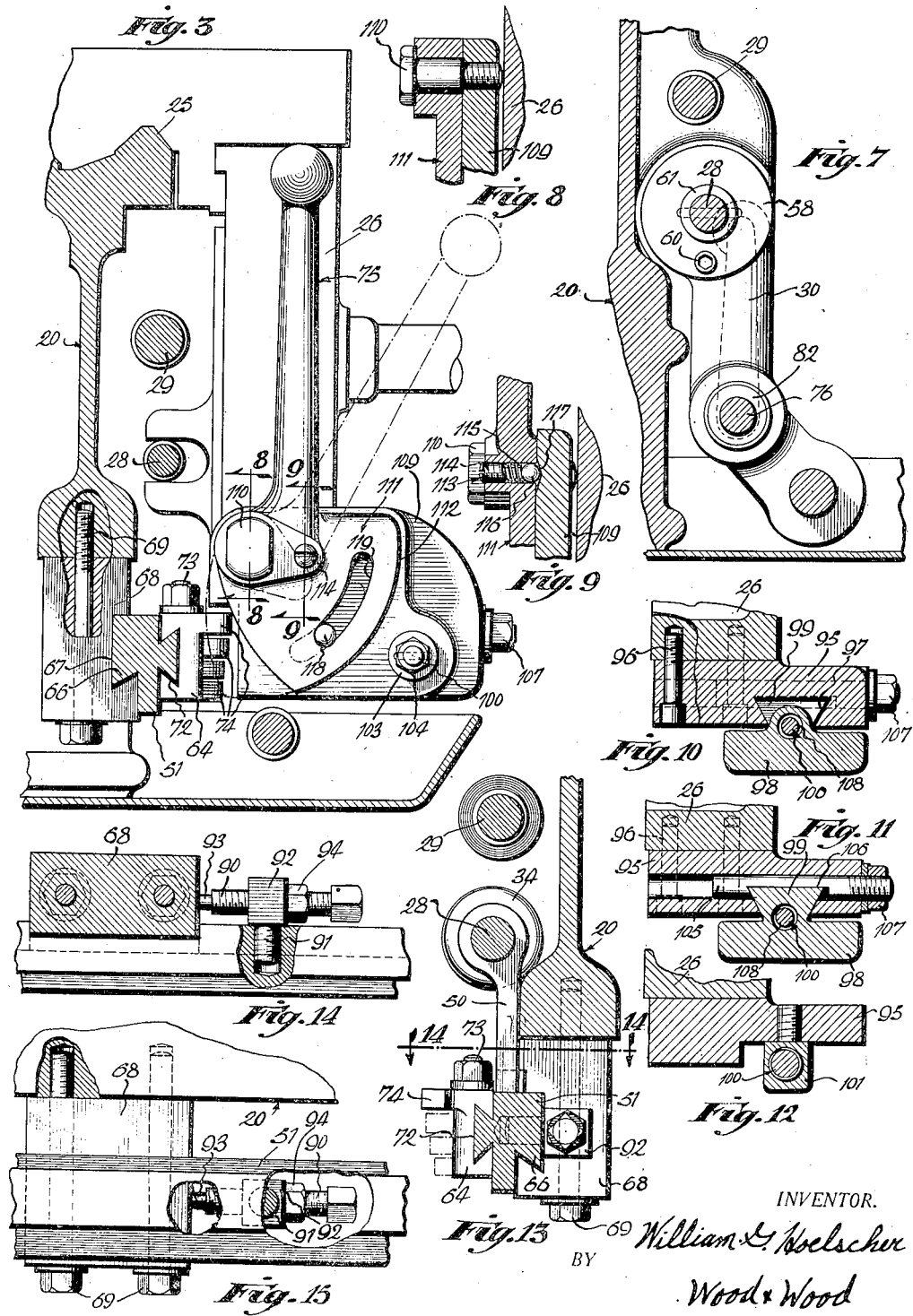

Patented Mar. 23, 1937

2,074,961

UNITED STATES PATENT OFFICE 2,074,961

MACHINE TOOL FEEDING MECHANISM

William G. Hoelscher, Norwood, Ohio, assignor to The American Tool Works Company, Cincinnati, Ohio, a corporation of Ohio Application September 16, 1935, Serial No. 40,715

16 Claims. (Cl. 82—21)

This invention relates generally to machine tools and is particularly directed to improvements in tool feeding mechanism and the control thereof. The improvements are preferably incorporated in a lathe for an accurately controlled tool carriage feed.

In producing accurate duplicate work such as counterturning, squaring up shoulders, grooving and necking for grinding, on quantities of parts, it is necessary that the feed to the carriage be accurately disconnected at the same point or points on each successive piece of work. It is also necessary to high efficiency and greater production that this disconnection be entirely automatic, regardless of the number of shoulders to be turned, for example on a given shaft.

It is therefore an object of the present invention to provide an improved feed control mechanism for the carriage of a lathe by means of which the carriage can be automatically stopped at a plurality of points for performing definite counterturning or shoulder operations on work, and enabling duplication of the operation on successive parts with a high degree of accuracy.

In setting the control mechanism for accomplishing feed discontinuance at predetermined points, the following fact must be taken into consideration. A certain amount of shifting movement brought about by the carriage movement itself is necessary to disconnection of the carriage feed control clutch. In order to locate the contact or throw out parts so that the power disconnection occurs at just the right instant it has been necessary to develop a novel arrangement for placing the mechanism in a position for setting the throw-out parts with the clutch disengaged.

It is therefore a further object of the present invention to provide a mechanism associated with the control elements, whereby the automatic stop unit may be placed against a positive stop where the clutch is disengaged and where the stop dogs can be suitably set against the carriage contact member with the carriage in the proper position in each instance for the shoulder to be cut. Therefore, when the control mechanism is returned to normal operating position the contact elements will be in position for engagement slightly ahead of actual power disconnection or the exact amount necessary to clutch throw-out movement. In other words, it is unnecessary for the operator to try out each setting of each control element to determine when the actual power disconnection occurs. He can be assured in advance that the tool will be stopped in its longitudinal feed at the exact intended point on the work without the awkward and time-wasting tests heretofore required.

It has also been recognized that it frequently occurs in a given run of work that there are differences in the depths of the center holes in which the spindle of the tailstock engages, as well as differences in the length of the work. Each variation would ordinarily require a resetting of all of the control mechanism for disconnecting the power when the particular shoulders are reached.

It is therefore a still further object of the present invention to provide a contact means associated with the carriage, adapted for engagement wth the stops of the control mechanism, which is adjustable to compensate for variations in the depths of center holes or the length of the work, whereby the operator can, by the simple operation of varying the position of the contact element longitudinally of the carriage, make it possible to proceed with each succeeding piece of work without altering the various positions of the stop or control mechanism in the least.

Other objects and certain advantages will be more fully apparent from a description of the accompanying drawings, in which:

Figure 2 is a fragmentary and partially sectional view looking at the front of the lathe, showing the details of the carriage feed and the carriage movement control mechanism.

Figure 3 is a sectional view taken on line 3—3, Figure 1, showing in enlarged detail the contact lever which engages the feed stop dogs and trips out the power to the carriage.

Figure 4 is a fragmentary view looking at the front of the carriage and illustrating the adjustable contact lever which is adapted for longitudinal resetting when there is variation in the depths of the center holes and the work being turned.

Figure 5 is a fragmentary sectional view taken on line 5—5, Figure 1, illustrating the connection between the rotatable section and translatable section of the stop dog bar.

Figure 6 is a fragmentary view looking at the front of the stop dog bar and further detailing the connection mentioned in the description of Figure 5.

Figure 7 is a sectional view taken on line 7—7, Figure 2, illustrating the support bracket at the tailstock end of the lathe, which mounts the carriage lead screw, the feed rod, and the stop dog bar.

Figure 8 is a sectional view taken on line 8—8, Figure 3, illustrating the pivotal mounting for the stop dog contact lever of the carriage.

Figure 9 is a sectional view taken on line 9—9, Figure 3, illustrating the detent means for holding the stop dog contact lever in set position.

Figure 10 is a sectional view taken on line 10—10, Figure 4, illustrating the details of the adjustable mounting for the stop dog contact lever.

Figure 11 is a sectional view taken on line 11—11, Figure 4, further detailing the adjustable mounting for the stop dog contact lever.

Figure 12 is a sectional view taken on line 12—12, Figure 4, illustrating the stationary nut into which the adjustment screw of the adjustable mounting is engaged.

Figure 13 is a sectional view taken on line 13—13, Figure 2, further illustrating the stop dog bar and the stop for limiting its clutch disconnecting movement.

Figure 14 is a sectional view taken on line 14—14, Figure 13, further detailing the stop means associated with the stop dog bar and the bed.

Figure 15 is a fragmentary front view further illustrating the stop means of Figures 13 and 14.

Figure 1:
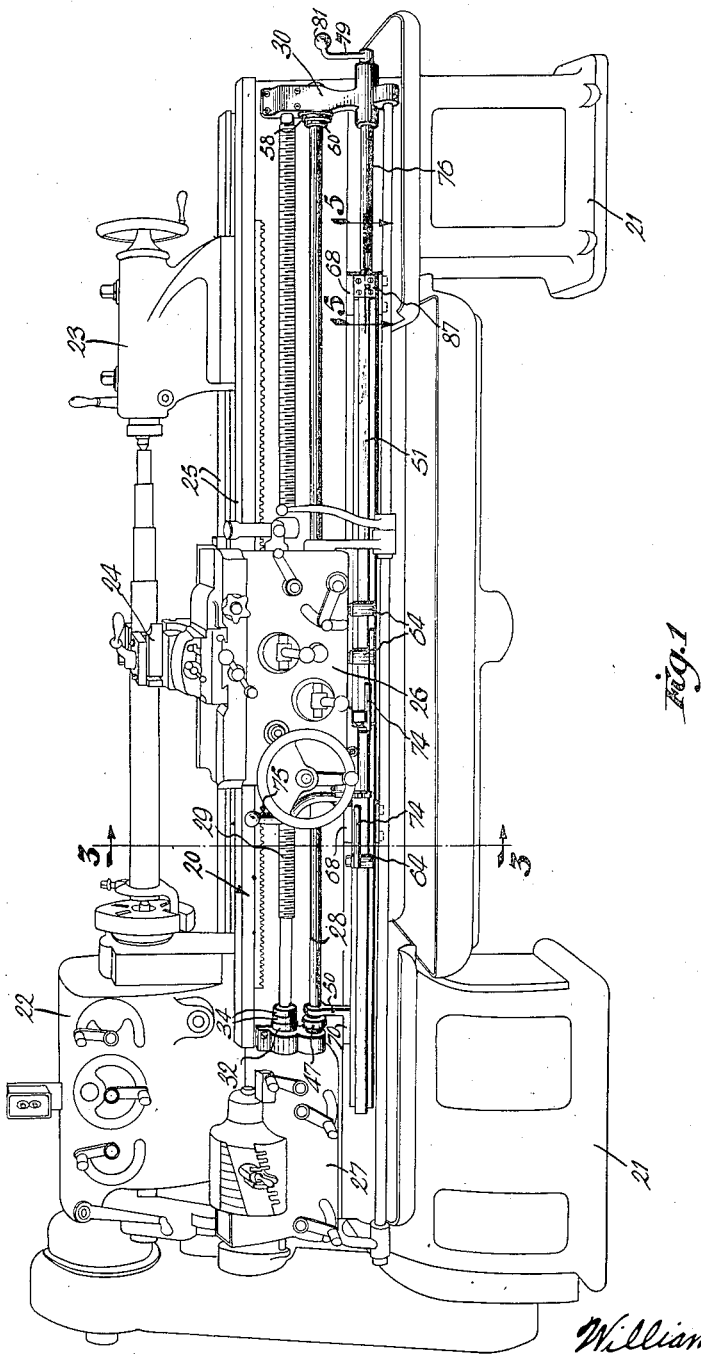
Figure 1 is a perspective view of a lathe incorporating the present improvements, those parts which are concerned in the present invention such as the means for accurately and automatically tripping the longitudinal feed at predetermined points and the means for compensating for variation in the depths of center holes being shown in shaded lines.

The improvements in lathe structure embodied in this application relate entirely to the operation of the carriage and control of the carriage feed movement. An automatic longitudinal stop mechanism for the carriage is provided which automatically trips the longitudinal feed at predetermined points by means of adjustable dogs spaced as desired along a stop bar. As the contact means of the apron of the lathe contacts with each of these dogs a clutch in the feeding mechanism is disengaged, stopping the tool carriage. When the contact means of the carriage is moved from contact with the particular stop dog, the feed clutch automatically re-engages and the carriage is ready to move on to the next stop. The advantage of this automatic stop mechanism for duplicate work resides particularly in elimination of delays due to work measurement and thus permits the lathe to actually cut metal more minutes per hour which, of course, results in more finished pieces of work per day.

A novel arrangement has been provided for convenient and accurate setting of the stop dogs along the bar. By operating a bar control lever at the tailstock end of the bed, the stop bar is moved endwise against a positive stop and the feed clutch is automatically held in its disengaged position while the stop dogs are being located. The bar control lever is then returned to its original operative position for allowing engagement of the clutch and the automatic stop mechanism is ready to function.

With this arrangement the stop dogs can be conveniently set by means of gauge or scale measurements with the absolute assurance that the feed will trip automatically at exactly the right point for every shoulder. This dog setting arrangement eliminates guess work in locating the stop dogs and is sure to bring about accurate results. It can be depended upon to produce any quantity of duplicate work to very close limits of accuracy and has the combined advantages of providing an automatic trip for the feed at predetermined points and of positively locating points for squaring up shoulders, grooving and necking for grinding.

The center hole compensator is provided for use under conditions where there are variations in the cut-off lengths of the work or in the depths of the center holes in the work ends, which variations would cause extreme inaccuracy unless the stop dogs were reset. Generally speaking, therefore, the purpose of the device is to eliminate the need for resetting of the stop dogs or shifting of the tools to match the position of the work on the lathe centers as the ends of successive shafts are in different relations to the tailstock spindle. After the stop dogs have been definitely positioned on the stop bar, the variations in the work are compensated for by slightly altering the position of the contact lever of the carriage which actuates the feed stop dogs and trips out the power feeds. This compensates for variations in the work, which may be observed between the first stop dog and the carriage trip or contact element when the cutting tool is touching the work end at the tailstock position, and does not change the relative positions of the dogs with relation to each other or the trip out clutch in the feed mechanism. Otherwise stated, the trip lever of the carriage is simply moved longitudinally the amount of the variation, that is toward or from the first stop dog, when the shafts vary in longitudinal positions on the spindles.

The adjustable element is mounted on the apron where it is in a position convenient to the operator and where he can see the tool position with relation to the work end without leaving the working position, particularly where long shafts are being turned. The device is of sturdy construction and assures accuracy and freedom from distortion. In cases where the shafts are accurately cut to length and the center holes are gauged to provide uniform depths, the compensating device is not necessary. However, any variation in work length or center hole depth makes it extremely valuable and brings about a considerable saving in time and insures duplication of the entire run of shafts.

For the purpose of fully illustrating the relation of the parts to a conventional lathe, the complete lathe is shown in outline in Figure 1. Many of the parts are unimportant to the present invention and for this reason the reference thereto will be quite brief. The bed of the lathe is indicated at 20 and is supported on legs 21, 21. The conventional headstock 22 is provided at one end of the bed and the tailstock 23 at the other end. The tool carriage 24 is disposed intermediate of the stocks and is adapted for longitudinal sliding movement on the ways 25 of the bed. The improvements herein concerned are directly related to the carriage, particularly to the apron 26 thereof. Also, the feed box 27 is important insofar as it contains the clutch and gearing for driving the carriage feed rod 28 and lead screw 29.

The lead screw and feed rod have adjacent ends journalled in the feed box and a compound bracket 30 at the tailstock end of the lathe respectively (see Figures 1 and 2). The lead screw and feed rod traverse the carriage, being in driving connection therewith in the conventional manner for moving the carriage longitudinally along the ways of the bed.

A shaft coupling sleeve 31 is journalled in the end wall 32 of the feed box. A head 33 on the inner end of this sleeve and nuts 34 on its screw-threaded outer end hold it in position in the wall against longitudinal movement. The adjacent end of the lead screw is counterturned and extends into the sleeve where it is rotatively fixed by means of a pin 35.

A bearing sleeve 36 is loosely fitted in the inner end of the coupling sleeve. A transmission shaft 38 has its end supported in the bearing sleeve 36 and carries a driving sleeve 39 thereon. Shiftable gear 40 is in splined connection with the driving sleeve and includes clutch teeth 41 engageable with adjacent teeth 37 on the coupling sleeve 36.

The feed rod 28, functioning additionally as the clutch shifting rod by virtue of longitudinal shifting movement, has its end supported in a clutch sleeve 42 pinned thereto by means of a pin 43. The clutch sleeve in turn is slidably supported in a gear 44 constantly meshing with gear 40 and having clutch teeth 45 adjacent to or engaged with the teeth on the clutch element or sleeve 42 upon longitudinal movement of the feed rod. The gear 44 is rotatively and slidably journalled in a fixed bushing 46 in the feed box wall. The gears 40 and 44 are fixed together against relative longitudinal or axial movement. When the gear 40 is shifted into clutch engagement for lead screw operation, gear 44 is moved away from connection with the clutch element 42 so that feed rod operation cannot take place. The feed rod is normally held in longitudinal position with the feed rod clutch (sleeve 42 and gear 44) in engagement apart from use of the lead screw.

A thrust collar 47 is secured to the feed rod by means of a pin 48 in position against the outer end of the clutch element or sleeve 42. An end thrust roller bearing 49 is disposed on the end face of the collar and the arm 50 extended up from the stop dog bar 51 engages the protruding race of this bearing 49.

As shown in Figure 2, the teeth of the feed rod clutch are disengaged and the entire mechanism associated with the feed rod is shown in the corresponding position, that is, with the carriage abutting one of the stop dogs. The journal bracket 30 at the tailstock end of the lathe incorporates means for spring urged clutch engaging movement of the feed rod. The means for accomplishing this consists of the following parts.

A sleeve 52 is fixed within the bracket and rotatively and slidably journals a spring retaining sleeve 53 which is in spline connection with the shiftable feed rod. The spring retaining sleeve 53 is counterbored to provide a shoulder at its inner end and a coil spring 54 is mounted in the chamber provided by the relationship of this counterbore with the rod. This spring is held under compression between the shoulder and a collar 55 pinned to the outer end of the feed rod.

An end thrust bearing assembly is provided. This bearing provides two sets of ball bearings. An end race 56 thereof is engaged within the sleeve 52 and against the end of the spring retainer sleeve 53. The intermediate race 57 is of larger diameter and lies against the end of the first mentioned sleeve or bushing 52. A cap 58 contains the other end race 59, this cap including a boss portion engaging the central race 57 and clamping it in position. The cap is held in position by means of screws 60. A feed rod shift movement limiting collar 61 is pinned to the shaft for abutment with the closure cap. Accordingly, when the feed rod is moved toward the feed box for declutching, the spring 54 is further compressed and promptly, upon release of the shift rod, will act to return the shift rod to normal clutch engaged position with the collar 61 lying against the closure cap. The spring retainer element 53 and the outer races rotate with the shift rod.

Accordingly, it will be seen that the feed rod moves the carriage along the ways of the bed in turning operations on the work and the power connection thereto is disconnected through the feed rod by longitudinal translation or axial movement of the rod. This longitudinal or axial shifting movement in the declutching direction is accomplished by means of the rigid arm 50 which projects upwardly from the stop dog bar 51 and which is mounted in the side of the bed in parallelism with the lead screw and feed rod and below the same. This rigid arm includes a bore 63 in its upper end which is of larger diameter than the feed rod and is traversed thereby.

The bar includes a semi-dovetail portion 66 along its rear side, which is slidably mounted in corresponding slots 67 cut in the forward faces of supporting blocks 68 attached to the under side of the bed by means of screws 69. The rigid shift arm 50 includes a foot portion 70 which is attached to the top face of the bar by means of screws 71. The outer face of the bar is provided with a longitudinally disposed dovetail portion upon which are adjustably mounted the stop dogs, these dogs including dovetail slots 72 corresponding to the aforesaid portion of the bar.

A suitable clamping bolt 73 is provided for each stop dog of the same character as that shown for clamping the adjustable trip or contact means of the carriage in place as will be described hereinafter. Each of the stop dogs 64 includes a contact arm 74 extending parallel with the bar and toward the tailstock end of the lathe, whereby its outer end is disposed for engagement or contact by the trip or contact lever 75 mounted on the carriage.

An end section of the shifting bar or actuator for the feed rod is in the form of a rod 76. This rod extends into and is mounted in the journal bracket 30 at the tailstock end of the lathe. An actuator screw 77 extends through a nut 77ª secured in a boss of the journal bracket 30 by means of set screws 78 and imparts longitudinal movement to the stop dog bar by means of end contact through appropriate throw-out means.

A handle 79 is secured to the outer end of the rod by means of a pin 80 and is in the form of a crank including a knob 81 on its angularly extended end. A plug 82 is screwed in the end of the bore opposite to the end containing the nut, this plug supporting the rod 76. The end of the rod within the bore is counterturned. A collar 83 lies against the shoulder formed by the counterturn and fits snugly within the bore being pinned to the rod and forming the retainer or abutment for a coil spring 84 under compression about the rod between the plug 82 and the collar 83. An end thrust ball bearing 85 is disposed between the collar 83 and the screw 72. The inner end of the screw engages the end race of the end thrust bearing and includes a pilot extension 86 projecting into the bore of the bearing race.

The connection between the rod 76 and the bar sections consists of the following arrangement. (See Figures 5 and 6.) A block 87 is secured to the face of the bar at the extreme end thereof. The rod extends loosely into this block. A taper pin 88 disposed through the block and through a slit in one side of the rod prevents rotation and endwise displacement of the rod. Screws 89 hold the block to the bar.

Rotation of the crank handle produces longitudinal shifting of the bar through the medium of the screw and nut sufficient for shifting the feed rod and declutching the power to the feed rod. The coil spring 84 under compression tends to maintain the screw and shifting bar against idle relative longitudinal movement, always tending to move the bar back toward normal position with the clutch in engagement, or the position where the stop dogs will be in position for declutching at the proper moment.

The amount which the stop bar is moved is definitely limited by means of an adjustable stop screw 90 associated with the bar and adapted to contact the supporting block at the headstock end of the lathe. For this purpose a screw 91 having a large head 92 is engaged into the rear face of the stop dog bar. The head of this screw is provided with a screw-threaded bore parallel with the bar. The adjustable contact screw 90 is engaged through this bore and includes a counterturned contact end 93 for abutment with the supporting block 68. A lock nut 94 is provided for securing this contact screw 91 in set position. When the operator moves the stop dog bar by rotating the crank handle 79 the feed rod clutch is disengaged and is automatically held in disengaged position against the block 68 while the operator sets the stop dogs. The stop means for the bar limits bar movement to a position where the clutch teeth of the feed clutch are clear a minimum amount for declutching. When the dogs are set the stop dog bar is returned by reverse movement of the crank handle to normal position and the stop dogs are then in the proper positions where they will be engaged and moved by the carriage, declutching at just the right movement for accurate shoulder work.

As stated heretofore, the contact means or the lever mounted on the carriage for engagement with the stop dogs is longitudinally adjustable for setting the same an amount corresponding to the difference in depth of the center holes or succeeding pieces of work or for differences in the length of the work. For this purpose the following arrangement is embodied at the base of the apron.

A supporting element or plate 95 is secured to the under side of the apron by means of screws 96. (See Figure 10.) The under side of this plate includes a dovetail groove 97 extended in parallelism with the stop dog bar. An adjustable pivot element 98 for the contact lever is supported in this dovetail slot, having a dovetail portion 99 for this purpose. A rotatable adjustment rod 100 is journalled through the pivot element in parallelism with and within the dovetail portion. This rod includes a screw-threaded end toward the tailstock end of the lathe, engaged in a fixed nut 101 secured to the plate or support element 95. Longitudinal displacement of the adjustable rod is prevented by means of an integral collar portion 102 engaging the end of the pivot plate adjacent the screw-threaded portion (see Figure 2), and a washer 103 engaging the opposite end of the element held in position by means of the adjusting nut 104 pinned to the rod.

As shown in Figure 11, a clamping bolt 105 is extended through the support element crosswise to the dovetail portion for fixing the plate in position. This bolt includes a transverse slot 106 traversed by the dovetail portion (see Figure 11), the rear end of the slot being inclined to engage the rear inclined face of the dovetail portion and adapted to be clamped thereagainst by means of a nut 107 on the exteriorly screw-threaded end of the bolt. The adjustment rod is counterturned as at 108 to clear this bolt.

The pivot plate includes a wide end flange 109. The contact lever 75 is pivoted on the upper rear corner of this flange or plate portion by means of a pivot screw 110. (See Figure 8.) The lever includes a contact segment 111 extended across the plate or flange portion of the pivot element, which segment has a curved edge 112, the margin of which is adapted to be swung into position where it is in line with the stop dogs for contact with the same.

A detent 113 is provided in the lever, including the usual plug 114, spring 115 and ball 116 and operates relative to depressions 117, locating the lever in position where the segment is clear of contact with the stop dogs. A pin 118 fixed in the pivot plate traverses an arcuate slot 119 located concentrically with relation to the pivot of the lever. This slot provides a definite limit to swinging movement of the lever in the direction for clearing the same from contact with the stops. Therefore, the contact lever, when regarded in its entirety or as a unit, includes the element incorporating the lever and segment, and the pivot plate which is longitudinally adjustable for varying the position of the segment relative to the carriage. The operator moves the rotatable adjustment rod an amount sufficient to set the contact segment a distance toward or from the carriage equal to the variation in center hole depth or work length.

In practice, for example in turning shoulders in quantity production work on shafts as illustrated in the present drawings, the operator sets the stop dogs from the tailstock end of a given piece of work. First of all he sets a stop dog against the contact element of the carriage with the tool against the end face of the work. He then feeds the carriage longitudinally by hand an amount equal to the distance to the first shoulder. He can determine this distance either by means of a measuring bar incorporated in the lathes or by measuring from the contact face on the carriage to the dog being set. He repeats this procedure, setting a dog in each instance until all of the dogs are set for the required shoulders.

In the present mechanism, previous to the setting of the stop dogs he rotates the handle 79 at the tailstock end of the machine for moving the stop screw 90 of the stop dog bar against the support block, thus declutching the feed to the carriage. With the stop dog bar in position, where the clutch shifting rod has been moved to declutching position, the stop dogs are then set. In the instance where a measuring bar or scale is used and the carriage moved to the point of the shoulder by reading the distance on the scale, the stop dogs are moved in each instance against the contact lever of the carriage and are then rigidly clamped in position. In other words, the carriage is moved longitudinally a given distance until the tool is at the desired point and the stop dog is then abutted against the segment of the contact lever, assuming that the lever has been swung downwardly to place the segment where its path of movement will cause it to contact the stop dogs. It will be noted at this point that the longitudinal contact extensions of the stop dogs are disposed at different elevations so that they may overlap in cases where shoulders shorter than the actual length of the dogs are being turned.

With the stop dogs all in position, the operator then returns the crank handle to normal position, thus throwing the feed clutch into engagement. Through this means it is unnecessary to test the position of each stop dog to determine whether or not the throw out will occur at the proper time to locate the shoulder accurately. Once having set the stop dogs a run of shafts or any other work may be operated upon without varying the stop dog positions, even though the depth of the center hole at the tailstock end of the lathe or the length of the work may vary.

The first stop dog is set with the bar in clutching position, eliminating the necessity for throwing the bar prior to testing the position of each piece of work. As the operator brings the carriage up to the first stop dog for each succeeding piece of work, he is able to note any variation in the depth of center hole or length of the particular piece of work as opposed to the piece just preceding. He is able to observe this variation by noting whether or not the tool is in direct alignment with the end face of the work. If there is disalignment he moves the tool carriage to bring the tool directly in line with the end of the shaft. He then adjusts the contact lever moving it longitudinally or parallel with the carriage feed against the first stop where it is rigidly secured in position by means of the clamping bolt. In other words, the abutment or contact element of the carriage is adjusted a distance which is exactly equal to the difference or variation in center hole depth or length of work. Thereupon operation upon a particular piece may be performed without altering the respective positions of the stop dogs on the bar.

The stop dogs, as stated, include contact arms projecting forwardly parallel with the bar, the arms of the respective stop dogs being disposed in different planes. The arm of the forward stop dog is in the highest plane and the remainder of the arms are stepped down in elevation toward the rear. Also, the forward longitudinal faces of these arms are in different planes. The planes of the arms recede from the rearmost stop dog, each arm being successively set back toward the forward one. Accordingly, if it should be desirable to turn shoulders which are close together, the arms of the adjacent stop dogs can be overlapped. The abutment lever on the carriage when swung clear of the first stop dog after contact therewith and then released will rest against the forward longitudinal edge of the first stop dog and will ride along this edge until it comes in contact with the end of the second stop dog, although this latter end is within the extent of the first mentioned arm due to the previously described offsetting in vertical and horizontal planes.

Having described my invention, I claim:

1. In a lathe, a bed, spindle means for supporting work, a carriage incorporating a tool for forming the work, a feed rod for translating the carriage along the bed in relation to the work, a clutch controlled drive for said feed rod, a longitudinally shiftable bar adapted to shift the clutch for disengaging the same, stop dogs adjustably mounted along the bar, a lever, having a plate portion, pivotally mounted on the carriage, the plate portion adapted to be swung into position for contact with the stop dogs, as the carriage moves, and means for varying the longitudinal position of the plate portion on the carriage in relation to the carriage to compensate for variation in the depth of the center holes in the work or the length of the work without resetting the stop dogs.

2. In a lathe, a bed, means for supporting work, a carriage longitudinally movable on the bed including a tool for operating on the work, a feed rod for moving the carriage along the bed and the tool in relation to the work, a bar longitudinally adjustably mounted on the side of the bed, a clutch for controlling the drive to the feed rod, a connection between the bar and the clutch for disengagement of the clutch, stop elements adjustably mounted on the bar, a device for shifting the bar a predetermined amount for disconnecting the clutch, and means on the carriage successively engageable with the stop dogs for automatically declutching the feed to the carriage when given points are reached on the work.

3. A mechanism for controlling the feed of a tool carriage including the carriage, feed rod and driving mechanism for the feed rod; comprising, a bar slidably mounted along the path of movement of the carriage, a series of stop dogs adjustably mounted on the bar, a clutch for connecting the power to the feed rod, said feed rod constituting a shifting rod for the clutch, an arm extended from the bar for shifting the feed rod, said stop dogs adapted to be interposed in the path of movement of the carriage and effective for disconnecting the clutch when engaged by the carriage, and a device for moving the bar carrying the stop dogs a predetermined amount, sufficient for disconnecting the clutch independently of carriage actuation of the stop dogs.

4. A mechanism for controlling the feed movements of a tool carriage including the carriage and the feed rod therefor, comprising; a slidably mounted bar movable along the path of movement of the carriage, stop dogs longitudinally adjustably secured on said bar, clutch controlled power means for driving the feed rod, shifter means for operating the clutch, said bar including an extension adapted to engage the clutch, an adjustably mounted pivot bracket secured to the carriage and adapted to be adjusted parallel to the bar, a swinging lever pivotally mounted on the pivot bracket and including a plate portion adapted to be swung into position where it will contact any one of the stop dogs, whereby the lever may be spaced from the carriage as desired and will be effective for successively engaging the stop dogs and disconnecting the clutch.

5. A tool feeding mechanism comprising, a bed, a carriage translatably mounted on said bed and carrying a tool, a feed rod traversing the carriage and adapted to move the same along the bed, means for driving the feed rod, a clutch for disengaging the power means, a shifter bar slidably mounted along the path of movement of the carriage, a handle connected to the bar for manually moving the same a predetermined amount sufficient for declutching, means in the connection of the handle to the bar for holding the bar in position when the handle is released, stop dogs mounted on the bar and adapted to be interposed in the path of movement of the carriage whereby the clutch may be automatically disengaged at predetermined points in the movement of the carriage and the bar may be moved into and held in a normally declutched position for setting the stop dogs while in this position.

6. In a feeding mechanism for a machine tool of the class described, including, a bed, a carriage adapted to be moved along the bed, a stop dog bar adjustably mounted along the side of the bed, a driving mechanism for the carriage including a longitudinally shiftable feed rod and a drive means therefor, a clutch on the end of the feed rod for disengaging the drive means therefor, spring urged shifter means normally maintaining the clutch in engaged position, a stop dog bar having a portion in engagement with the feed rod for shifting the same, stop dogs mounted for adjustment along the bar, a screw-threaded rotatable element engaging the bar including a crank handle and adapted to translate the bar, component stop elements on the bed and bar respectively for limiting movement of the bar in declutching direction, and means on the carriage engageable with the stop dogs for sliding the bar and feed rod and declutching.

7. In a carriage feeding mechanism for use on a machine tool including a feed rod, driving means and a clutch therefor; a shifter means for operating the clutch including a bar slidably supported along the path of movement of the carriage, a pivot bracket slidably adjustably mounted on the carriage, an adjustment screw screw-threaded through a portion of the carriage for setting the pivot bracket in any desired position, stop dogs adjustably mounted along the bar, a swinging lever pivoted on the bracket and including a plate portion adapted to be placed in position for engaging the stop dogs and declutching the clutch for stopping the movement of the carriage, said lever disposed in position at one end of the carriage and projecting upwardly to a position adjacent the top of the carriage.

8. In a lathe, including, a bed, a headstock, a tailstock, a carriage slidably mounted on the bed between the headstock and tailstock, a feed rod for translating the carriage, and a transmission for rotating the feed screw; a clutch for disconnecting the power to said feed screw, said feed rod mounted longitudinally of the bed, parallel with the feed screw for disengaging the clutch, said rod supported in the feed box wall and in a journal bracket, said journal bracket including a spring under compression engaging the feed rod for normally urging the feed rod to declutched position, stops for limiting the movement of the feed rod in either direction, a stop dog supporting bar adjustably translatably mounted on the side of the bed for movement along the path of movement of the carriage, stop dogs on said bar, means on the carriage adapted to engage said stop dogs, a screw threaded through the journal bracket adjacent the end of said bar, end thrust bearings between the bar and screw, a collar on the feed rod, a rigid arm extended from the bar and adapted to engage the collar, a spring for normally maintaining the bar in declutching position, a crank handle on the end of the screw for imparting a predetermined number of degrees of movement to the rotary shaft sufficient for declutching thereby enabling the operator to set the stop dogs with the bar in position where the clutch is disengaged.

9. A carriage feeding mechanism, comprising, a feed rod, a drive therefor, a clutch for the drive for connecting the same to the feed rod, a bar movably mounted along the path of movement of the carriage, stop dogs adjustably mounted on the bar, an abutment element pivotally and longitudinally adjustably mounted on and in relation to the carriage, said element including a plate portion and a handle portion whereby it can be swung into position where the plate portion will engage the stop dogs, said bar connected to said clutch for disconnecting the same when the element engages and moves the stop dogs.

10. In a carriage feeding mechanism, including, the carriage, the feed rod, drive therefor and clutch, a bar shiftably mounted along the path of movement of the carriage, stop dogs mounted on the bar, a connection between the bar and the clutch whereby movement of the bar operates the clutch, an abutment element on the carriage for engaging the stop dogs, and a manually operated means connected to the bar for translating the bar a predetermined amount sufficient for declutching the clutch.

11. In a tool feeding mechanism, a bed, a tool carriage, a feed rod for moving the carriage along the bed, gearing for driving the feed rod, a clutch for connecting the gearing and feed rod, stops adjustably mounted along the path of movement of the carriage and connected to the clutch for actuating said clutch, a contact element pivotally mounted on the tool carriage and adapted to be swung into and out of position for engagement with the stops as the tool carriage is fed, and means for moving the stops and clutch to disengage the drive to the feed rod independently of actuation of the dogs through the contact element of the carriage.

12. In a tool feeding mechanism, a bed, a tool carriage, a feed rod for moving the carriage along the bed, gearing for driving the feed rod, a clutch for connecting the gearing and feed rod, stops adjustably mounted along the path of movement of the carriage and connected to the clutch for actuating said clutch, a contact element on the carriage for successively engaging said stops and disengaging the clutch, said contact element adjustably mounted for resetting toward and from the carriage, said dogs engageable by said carriage as the carriage is fed for stopping carriage feed, and a clutch shifter for moving the clutch to disengaged position while the dogs are being set.

13. In a lathe, a bed, means for supporting work, a carriage incorporating a tool for operating on the work, a feed rod for translating the carriage along the bed in relation to the work, a clutch controlled drive for said feed rod, a longitudinally shiftable bar connected to the clutch for disengaging the same, stop dogs located on the bar, an element pivotally mounted on the carriage adapted to be swung into position for contact with and actuation of the stop dogs, and adjustment means for varying the longitudinal position of the element on the carriage in relation to the carriage for compensating for variation in the depth of the center holes in the work or the length of the work.

14. In a lathe, a bed, a headstock, a tailstock, a carriage slidably mounted on the bed between the headstock and tailstock, a feed rod for translating the carriage, means for rotating the feed rod, a clutch for disconnecting the power to said feed rod, said clutch associated with said feed rod, a journal bracket for one end of the feed rod including a spring under compression engaging the feed rod for normally urging the feed rod to declutching position, a stop dog supporting bar adjustably translatably mounted on the side of the bed for movement along the path of movement of the carriage, stop dogs adjustably secured along said bar, means on the carriage adapted to engage said stop dogs, a rigid arm extended from the bar and adapted to engage and translate the feed rod, a spring for normally maintaining the bar in declutching position, and a screw including a handle and adapted to shift the bar a predetermined amount sufficient for declutching.

15. In a carriage feeding mechanism including the carriage, the carriage feed rod, the driving means for the feed rod, and a clutch for disconnecting the driving means from the feed rod; a shiftable bar supported along the path of movement of the carriage, stop dogs mounted on the bar, an abutment means on the carriage successively engageable with the stop dogs, said bar connected to said clutch whereby the aforesaid engagement causes declutching, and manual shifting means for moving and holding the bar in declutching position while the dogs are being set.

16. In a carriage feeding mechanism including the carriage, the carriage feeding means, the driving means for the carriage feeding means, and a clutch for disconnecting the driving means from the carriage feeding means, a shiftable bar supported along the path of movement of the carriage, stop dogs mounted on the bar, an abutment means on the carriage adapted to selectively engage said stop dogs, said bar connected to said clutch whereby the aforesaid engagement causes declutching, and a shifting device for moving the bar and operating the clutch for disconnecting the driving means from the carriage feeding means.

WILLIAM G. HOELSCHER.